United States Patent [19]
Mack et al.

[11] Patent Number: 6,126,708
[45] Date of Patent: Oct. 3, 2000

[54] AIR PLENUM FILTER SEALING SYSTEM

[75] Inventors: Joseph A. Mack, Phoenix, Ariz.;
Wallace Ronald Saldin, Bloomington, Minn.; Brad A. Terlson, Maple Grove, Minn.; Edward L. Schwarz, Minneapolis, Minn.

[73] Assignee: Honeywell International Inc., Minneapolis, Minn.

[21] Appl. No.: 09/209,181

[22] Filed: Dec. 10, 1998

Related U.S. Application Data

[63] Continuation-in-part of application No. 08/993,459, Dec. 18, 1997, Pat. No. 5,944,860.

[51] Int. Cl.⁷ .................................................. B01D 46/10
[52] U.S. Cl. ............................... 55/502; 55/492; 55/496; 55/497; 55/501; 55/DIG. 31; 55/DIG. 35
[58] Field of Search .............................. 55/492, 497, 496, 55/501, 502, 511, 513, 516, DIG. 31, DIG. 35, 507, 509; 181/284

[56] References Cited

U.S. PATENT DOCUMENTS

| | | | |
|---|---|---|---|
| 4,584,005 | 4/1986 | Allan et al. | 55/DIG. 31 |
| 4,865,637 | 9/1989 | Gruber | 55/DIG. 31 |
| 4,961,849 | 10/1990 | Hull et al. | 55/DIG. 31 |
| 4,963,171 | 10/1990 | Osendorf | 55/DIG. 31 |
| 5,032,272 | 7/1991 | Mould | 55/DIG. 31 |
| 5,143,604 | 9/1992 | Bernard et al. | 55/DIG. 31 |
| 5,176,570 | 1/1993 | Liedl | 55/DIG. 31 |
| 5,332,409 | 7/1994 | Dralle | 55/516 |
| 5,415,677 | 5/1995 | Ager et al. | 55/502 |
| 5,435,915 | 7/1995 | Connors, Jr. | 55/502 |
| 5,494,506 | 2/1996 | Ford et al. | 55/502 |
| 5,736,691 | 4/1998 | Batog et al. | 181/284 |
| 5,743,927 | 4/1998 | Osendorf | 55/DIG. 31 |
| 5,837,022 | 11/1998 | Chapman | 55/502 |

FOREIGN PATENT DOCUMENTS

| | | | |
|---|---|---|---|
| 406269624A | 9/1994 | Japan | 55/DIG. 31 |

*Primary Examiner*—David A. Simmons
*Assistant Examiner*—Minh-Chau T. Pham
*Attorney, Agent, or Firm*—Robert B. Leonard

[57] ABSTRACT

An air duct has a filter mount opening originally intended to accept a shallow filter element for filtering air entering the duct. The opening has an interior flange whose original purpose was to support the shallow filter element. This flange has interior edges defining an air passage opening. The invention is implemented a filter unit including a frame and a deep filter element mounted in the frame. The frame has dimensions allowing the filter unit to replace the conventional shallow filter element with the frame inserted into the air passage opening and closely spaced to all of the interior edges. A resilient gasket is mounted adjacent to the opening's interior flange and projects slightly into the air passage opening so as to contact the deep filter element's frame. The gasket prevents air leakage between the interior flange's interior edges and the frame. In one embodiment, the frame has a flange to mate with a surface of the air passage opening's interior flange so as to prevent air leakage and to position and support the filter unit.

16 Claims, 2 Drawing Sheets

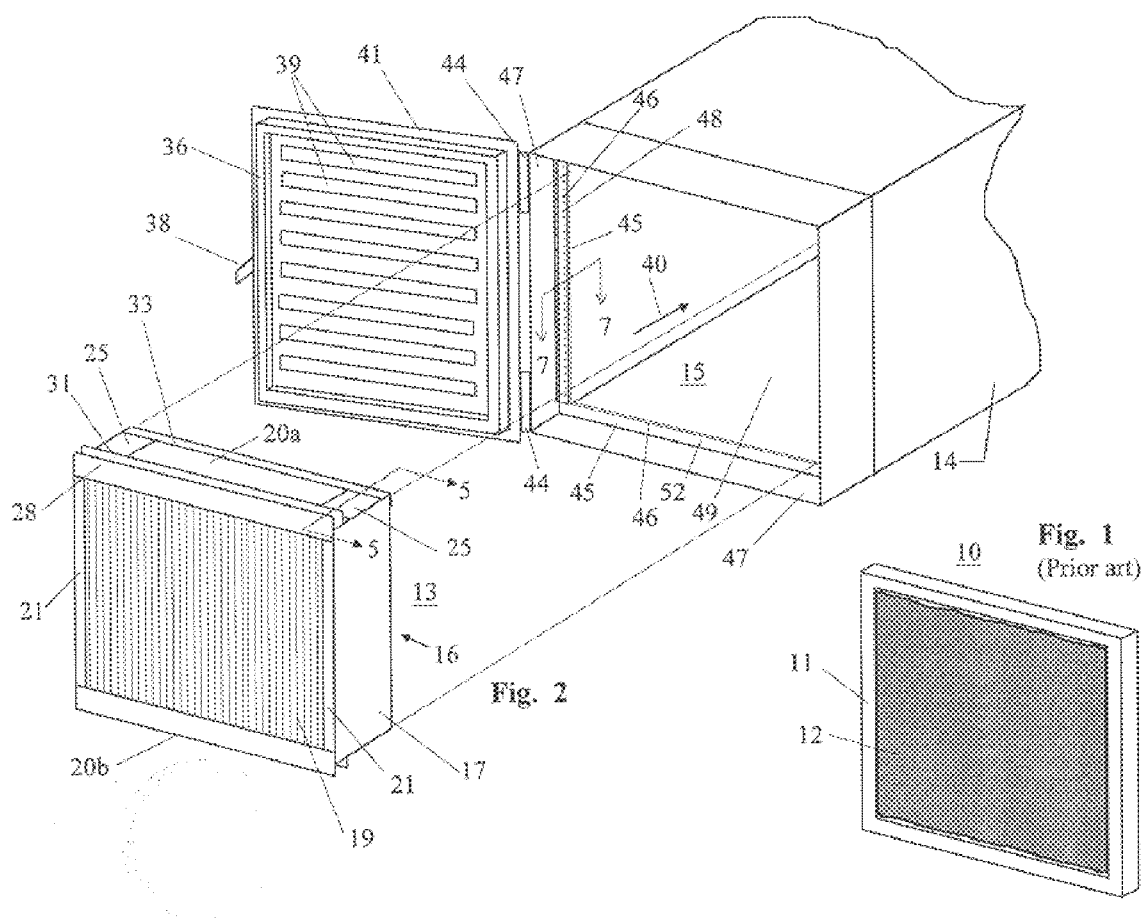

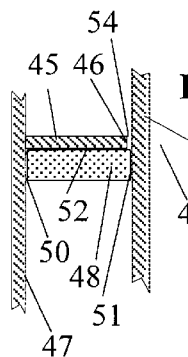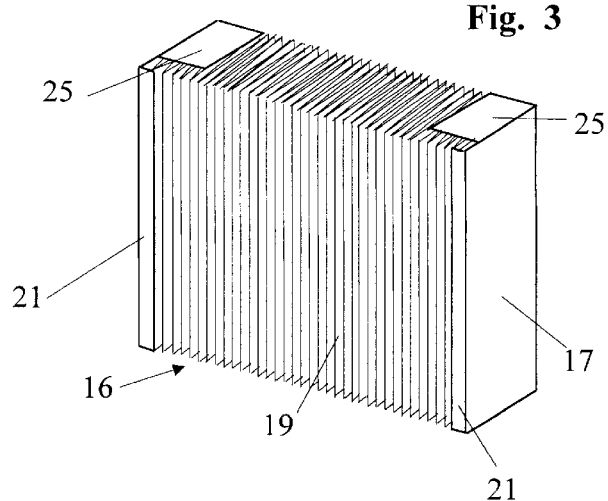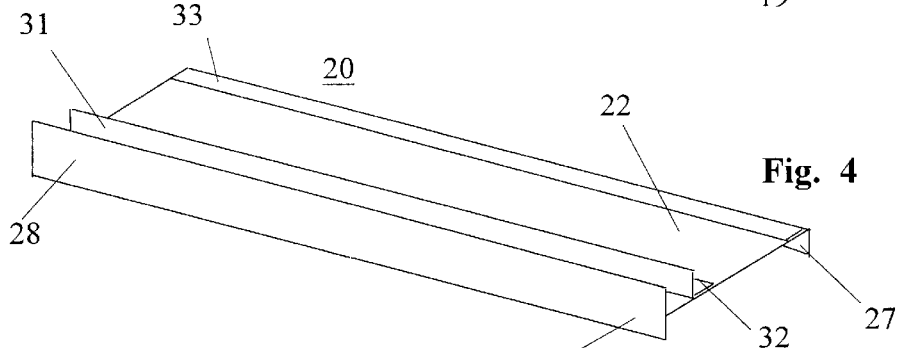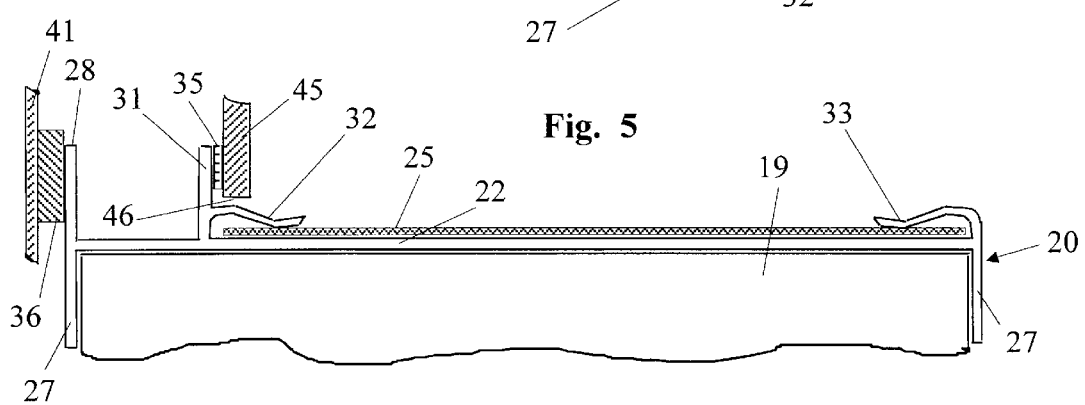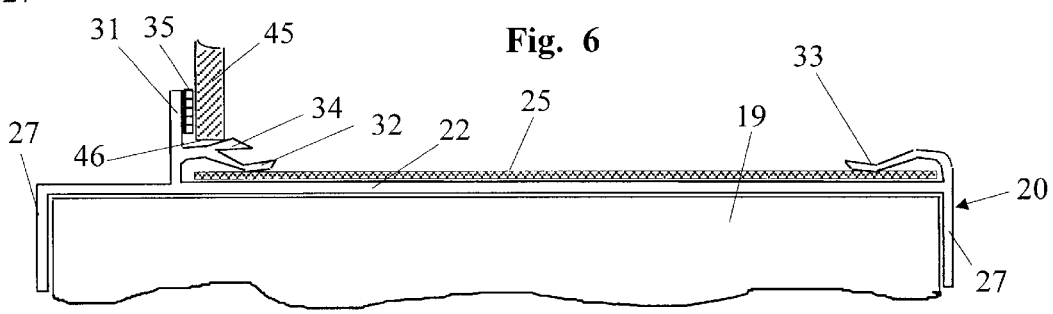

AIR PLENUM FILTER SEALING SYSTEM

This appln is a C-I-P of Ser. No. 08/993,459 filed Dec. 18, 1997, U.S. Pat. No. 5,944,860.

BACKGROUND OF THE INVENTION

It is customary to filter the air provided to occupied spaces by heating, ventilating, and air conditioning (HVAC) equipment. One convenient and effective way to do this is to filter the air entering the return air intake opening in the plenum or duct leading to the furnace or air conditioner. A typical air circulation system of a house for example, has a fan which while operating constantly draws air present within the occupied space into the intake opening for reheating or reconditioning, and this air is caused to pass through a filter to remove particulate contamination. The filter may be a simple mechanical filter with a disposable or renewable element, or may be electronic. The following description involves mechanical filters which do nothing more than trap these particles on the upstream filter surface or within the filter through which the air passes.

It is helpful at this point to define terms that will be frequently used in the description to follow. The medium of an air filter is the actual material which performs the filtering function. The air filter element is the disposable unit including the medium, and which is installed in, and after filling with trapped particles is removed from a plenum, duct, or housing. The air filter unit or simply air filter, is the entire filter assembly including the element and the non-disposable structure in which the element is mounted.

In residential systems, the medium often comprises a nominally one inch (2.5 cm.) thick rectangular woven glass fiber mat configured as a box-type filter element. The length and width dimensions of these filter media vary with the particular installation, but are typically each between one and two feet (30.5 cm. to 61 cm.). A flexible cardboard edging having a U-shaped cross section encloses the edge of the mat's periphery to form the air filter element and gives the element a generalized box shape. The edging provides some stiffness for the element. Other types of elements use pleated filter paper as the medium, again having the same nominal 1 in. thickness and U-shaped edging. These filter elements are available in a variety of widths and lengths to conform with the dimensions of the opening in which the element is to be installed. This filter format will be referred to hereafter as a shallow filter element or shallow format filter.

For systems having return air filtration and using mechanical filtration, a shallow filter element is often placed in the return air intake opening. These openings have centrally or inwardly projecting sheet metal or plastic flanges around the entire periphery of the opening. The flanges' outer surfaces all lie in a common plane. The filter's edging is pressed against the flange's outer surface by force from a grille cover having an internal ridge which presses against the edging's outer surface creates a nearly air-tight seal between the outer flange surface and the inwardly facing edging surface. This air-tight seal forces almost all of the air entering the plenum to pass through the filter element medium.

As one would expect, different types of air filters have different levels of efficiency. "Efficiency" in this context refers to the percentage of the total number of particles in the air stream within a given size range which the filter element can trap. The efficiency of filters varies with different particle size ranges. For example, a high efficiency filter medium can trap a significant percentage of particles whose size is on the order of 0.3 micron, where a low efficiency medium traps relatively few of them. There is also the consideration of overall efficiency as opposed to filter medium efficiency. Overall efficiency takes into account the unavoidable air leakage around a filter element mounted in its housing. Leaking air is completely unfiltered. Its particle load pollutes the stream of filtered air, resulting in an overall efficiency lower than the medium efficiency.

But efficiency is not the only measure of medium quality. It is also important that a filter not create a large pressure drop in the air passing through it. A large pressure drop requires a more powerful fan to force the required air volume through it. And if the pressure drop is too great, the medium will deflect and perhaps even burst or tear as the load of trapped debris obstructs ever more pores within the medium. The amount of pressure drop presented by a particular medium depends largely on the number of pores or openings per unit area of the medium, on the average minimum cross section area of the pores, and of course on the total area of the medium through which the air flows. To a certain extent, pressure drop is also dependent on the medium thickness.

Obviously, as a filter element loads up with debris during use, its pressure drop increases. This leads into a further consideration for filters, that of carrying capacity and filter element life. "Carrying capacity" refers to the number of particles the filter element can trap per unit area projected to the air stream before clogging up to a point where the ability to remove particles is impaired and/or the pressure drop across the filter element becomes unacceptable. ("Dust-holding" capacity is an industry term which we intend to be substantially equivalent to carrying capacity.) Other things being equal, carrying capacity is directly related to total medium area. The capacity of mat filters which trap some of the particles within their volume may also depend to some extent on their thickness. Carrying capacity is one factor in determining the life of the element and thus the cost of filtering the air.

Advances in filter technology has led to improvements in each of these characteristics. Nevertheless, it is still true that there are tradeoffs between efficiency, pressure drop, and carrying capacity. For example, as a filter medium becomes more efficient, its pressure drop typically increases because the individual pores become smaller, other things being equal. Of course, it may be possible to add more pores per unit area, but the problem of adding pores is not trivial. Carrying capacity is closely related not only to the number of pores or area available for adsorbing particles, but also to pore size. As the average size of the pores decreases, efficiency usually increases, but the increased number of particles trapped per second and smaller pores cause the medium to more quickly clog, reducing its life.

An easy way to minimize pressure drop and maximize capacity is to increase total medium area. This fact has led to the development of pleated filters. These pleated filters are made from a long strip of filter paper medium which is folded back and forth on itself to form a series of pleats. So long as the adjacent pleat panels do not touch each other the air can easily flow through the individual panels. In order to maintain the topology of the pleats under the force created by the normal pressure drop across the medium, it is possible to insert combs on the downstream side of the medium which have individual teeth between each pair of adjacent pleat panels to prevent the pleats from collapsing against each other from the force created by the pressure drop across individual panels.

Mechanical filter elements typically now in use in HVAC systems lack the efficiency which some experts believe is needed for adequate quality of the filtered air. Environmental health studies and empirical experience both show that it is not only the larger particles which these shallow format mat and pleated filters do trap that affect air quality. Smaller particles such as tobacco smoke, mold spores, bacteria, pollen, etc. which pass through many filters without being trapped, can also cause allergy or health problems for some people. And of course, even small particles can accumulate to an extent which creates a film of dust on hard surfaces and causes fabrics on furniture and in window treatments to become dirty or discolored. Secondly, shallow format filters have a relatively small carrying capacity.

More recently, improved filter elements have been developed whose pressure drop and carrying capacity is superior to that of shallow format mat and pleated filters. These elements typically have relatively deep pleats (4–5 in. or 10–12.5 cm.) to provide a relatively large medium area providing the improved pressure drop and carrying capacity. These deep pleat elements are intended for use in return air ducts having chambers capable of receiving such filter elements. In a preferred design, the filter elements collapse into a relatively small volume for shipping. They have relatively rigid cardboard or plastic end strips or panels which detachably mate with reusable side panels to form a reasonably rigid rectangular filter element assembly. See U.S. patent application Ser. No. 08/738,276 by Osendorf et al. filed Oct. 26, 1996, which application was continued in application Ser. No. 08/967,115 filed Nov. 12, 1997 and issued on Nov. 24, 1998 as U.S. Pat. No. 5,840,094 for an example of such a collapsible filter element which can be assembled into a deep format pleated filter element using a pair of special side panels. The filter element assembly is inserted into the chamber, placing the filter element directly in the return air stream. The chamber's design seals the edges of the filter assembly reasonably well against peripheral leakage, improving the overall filtering efficiency. Such a deep pleat filter element and indeed, any type of filter element substantially thicker than shallow format filter elements and to which the invention described below is applicable, will be called a deep filter element or deep format filter.

It would be advantageous to replace shallow format return air intake opening-mounted filters with deep format pleated filters. However, the dimensional disparity between these deep format pleated filter elements and the shallow format filter element does not allow the former to directly replace the latter in a return air opening installation.

BRIEF DESCRIPTION OF THE INVENTION

We have devised a solution to this problem which allows directly substituting a deep format pleated or other filter element for the conventional shallow filter element. This solution is embodied in an air filtering system which includes a filter unit for installation in a filter mount opening of an air duct to replace the shallow rectangular filter element. To clearly define the arrangement, consider the air duct to have an axis defining the general direction of air flow through the duct. The air duct also has an interior surface from which projects centrally an interior peripheral duct flange having a mating surface facing along the air duct axis and interior edges defining an air passage opening. This mating surface is adapted and intended to normally receive the periphery of the shallow filter element.

The filter unit has first through fourth panels which define the periphery of the filter unit and together form a frame for the filter unit. The filter unit frame is dimensioned to fit into and project through the air passage opening with close spacing of the first through fourth side surfaces to adjacent interior edges of the flange. A resilient flange gasket is present along the duct flange which projects into the air passage opening adjacent to the duct flange. The flange gasket contacts the filter unit's adjacent panel, to form a seal between the flange and the panel. The flange gasket opposes air leakage between the flange interior edge and the filter unit's adjacent panel.

We prefer to attach the flange gasket to the interior surface of the air duct closely adjacent to the duct flange. The flange can have a rectangular cross section and be formed from 2 lb. low permeability (closed cell) polyurethane foam.

BRIEF DESCRIPTION OF THE DRAWINGS

FIG. 1 is a perspective view of a typical prior art filter element.

FIG. 2 is a partially exploded perspective drawing of a air intake and deep format filter assembly according to the invention.

FIG. 3 is a perspective view of the filter element shown in FIG. 2 as part of the filter assembly.

FIG. 4 is an enlarged perspective view of the side panel forming a part of the filter assembly of FIG. 2.

FIG. 5 is a further enlarged cross section of the side panel and the mated flap of the filter element's end panel.

FIG. 6 shows a variation of the FIG. 5 side panel cross section.

FIG. 7 is an enlarged cross section of an edge of the opening to the air duct.

DESCRIPTION OF THE PREFERRED EMBODIMENTS

FIG. 1 is an example of the common shallow format mat filter element 10 having a cardboard edging 11 on the mat-type medium 12. Edging 11 and medium 12 are somewhat resilient and compressible in the thickness dimension as well as in the length and breath dimensions.

FIG. 2 shows a typical shallow mat filter element installation modified to incorporate the invention in a complete filter system. Turning first to the known and conventional aspects of FIG. 2, an air duct or plenum 14 has a filter mount opening 15 defined by interior duct surface 47 and the exterior edges of duct 14. Opening 15 serves as a return or intake for the typical air handling or processing system, and also as the structure within which the filter of choice is to be mounted. Duct 14 can take a variety of forms, and that shown is only one possible example. Other installations may find opening 15 mounted into a ceiling or wall or forming a transition to a duct having a round or elongated rectangular form. A grille or cover 41 is held by hinges 44 allowing grille 41 to be swung between the open or access position shown, into a closed or shut position where grille 41 completely covers intake 15. A latch 38 holds the grille 41 in its closed position. Grille 41 has a plurality of vents or slots 39 through which air can easily pass during normal operation. In many installations there is a peripheral ridge or projection 36 surrounding vents 39 on the inside surface of grille 41 and having outside dimensions allowing ridge 36 to fit within skirt 47 when grille 41 is closed. Arrow 40 represents an axis of duct 14 and indicates the customary direction of air flow within duct 14.

Within opening 15 there is an interior peripheral duct flange 46 having interior edges 45 which cooperatively form for duct 14 a smaller air passage opening generally at 49. The duct flange 46 has a mating surface 52 generally facing outwardly and along air duct axis 40. Mating surface 52 cooperates with interior surface 47 to form a recess for receiving a standard shallow format filter 10 such as shown in FIG. 1. In some of the designs having a ridge 36, when grille 41 is swung into its closed position, the spacing between ridge 36 and duct flange 46 is such as to clamp filter element 10 within this recess. In such an arrangement, flange 36 presses the edging 11 of filter element 10 against the mating surface 52 to compress edging 11 slightly and create a reasonably good air seal between these components. This arrangement causes nearly all of the air entering duct 14 to pass through element 10. Other arrangements rely on pressure drop across the filter element 10 to press the filter element edging 11 against flange 46 to create an air seal. In any case, the interior edges of flange 46 will typically form part of the filter mount opening 15 to duct 14.

In explaining the features of FIG. 2, it is clearest if the structure of filter unit or assembly 13 and its individual components is first described with reference to the features of FIGS. 3–5. Filter unit 13 as shown is only one of several different embodiments which can be used in implementing the invention as defined in the claims which conclude this patent. The motivation for the structure shown for filter unit 13 is that the filter element 16 can be collapsed for cheap and efficient shipping and storage. When a filter element 16 is to be put into service, the three separate components shown for filter unit 13 are assembled into the form shown in FIG. 3 and unit 13 is then inserted into opening 15.

Filter unit 13 incorporates filter element 16 and two identical side panels 20a and 20b shown in FIG. 4. These three individual components can be assembled into filter assembly 13 by connecting two side panels 20 to two end panels 17 (the left end panel being hidden in FIGS. 2 and 3) of element 16. These four panels 17 and 20a and 20b when so assembled form a frame for filter unit 13, which frame provides the mechanical interface between the filter element 16 and the filter mount opening 15.

Filter element 16 includes in one embodiment a deep format pleated medium 19, and one end panel 17 attached to each of the two outer or end pleats of medium 19. Each end panel 17 includes top and bottom assembly tabs 25, only the top tabs 25 being shown in FIGS. 2 and 3. End panels 17 can be formed of any reasonably stiff material such as cardboard or plastic sheet. We prefer cardboard because it is cheap and easy to score so as to create hinge or fold lines such as for tabs 25. A pair of stiffening flanges 21 project at 90° angles from the main body of panel 17. One of these flanges 21 for each end panel 17 is hidden behind the main body of panel 17. It is easy to score the end panel 17 material to create fold lines for creating the flanges 21.

Side panel 20 shown in FIG. 4 is designed to mate in pairs with the assembly tabs 25 of filter element 15 to form filter assembly 13 of FIG. 2 (wherein the side panels are designated 20a and 20b). Side panel 20 is a variation of the similar article shown in the previously mentioned Osendorf, et al. patent. We prefer to form side panels 20 from a relatively flexible plastic. As shown in FIG. 4, side panel 20 in essence includes five different flanges, all extending the entire length of panel 20. This allows side panels 20 to be formed by cutting pieces from extruded plastic material of the cross section shown in FIG. 5, extrusion being a preferred way to create components of this shape and material.

Side panel 20 shown in FIG. 4 includes flanges 32 and 33 formed on what is an outer surface of panel 20 and which create narrow slots or spaces (best seen in FIG. 5) between themselves and a main panel portion 22. The assembly tabs 25 of filter element 15 are designed to slip into the slot defined by flanges 32 and 33 on the one hand, and main panel 22. This arrangement duplicates that revealed in the aforementioned Osendorf, et al. application.

Side panel 20 has stiffening flanges 27 running along its entire length on each edge of main wall 22 and extending in the direction which an inner surface of panel 20 faces. There is a sealing flange 31 attached to the outer surface of panel 20 and which extends at approximately right angles to this outer surface. In one embodiment, there is a resilient foam rubber gasket or weather strip 35 on the surface of flange 31 facing flanges 32 and 33. Although not present on the commercial embodiment of this invention, there is also a support flange 28 which may be an extension of the adjacent flange 27 as shown in FIG. 4, or be offset from flange 27.

The filter assembly 13 of FIG. 2 is formed by slipping tabs 25 into the slots formed by flanges 32 and 33, one tab from each end panel 17 into the slot of one side panel 20a or 20b. Flanges 21 should fit inside flanges 27 so as to keep them tucked firmly against medium 19. When so assembled, filter assembly 13 is remarkably rigid, with the edges of medium 19's pleats pressing firmly against the inner surface of each side panel 20's main wall 22. In essence end panels 17 and side panels 20a and 20b cooperate to form a frame for supporting medium 19 and for adapting medium 19 to fit into the recess formed by flange 46 and skirt 47.

The user inserts filter assembly 13 into the filter recess of FIG. 2 formed by flange 46 and skirt 47, with filter element 16 projecting past the interior edges 45 of flange 46 and into the opening 49 formed by these edges. Closing the grille 41 holds filter assembly 13 in place within the rectangular opening to duct 14. The dimensions of side panels 20a and 20b and of the filter element 15 itself must be chosen appropriately to allow filter element 15 to fit within the opening formed by the flange 46 edges. Of course, if there are components within duct 14 close to the opening formed by flange 46, then the installation may not be mechanically compatible with the filter assembly 13 design shown.

Flange 28 is intended to make contact with ridge 36 as shown in FIG. 5 when grille 41 is closed. Pressure of ridge 36 against flange 28 holds flange 31 and its gasket 35 firmly against flange 45. To further prevent air leakage around filter assembly 13, gasket 48 can be installed along the edge of flange 46 and adjacent to filter end panels 17. There is foam rubber gasket material available with adhesive coating on one surface which can be attached to project slightly into the opening formed by flange edges 45 so as to contact the outer surface of end panel 17 and form a close if not perfectly air tight seal to end panel 17.

An alternative design may have ref. no. 35 designating a strip magnet permanently bonded to flange 31 and whose attractive force to a ferrous flange 46 simultaneously holds filter element 15 in place and forms a good air seal between flange 46 and flange 31. In this design, there will be no need for flange 28.

In fact, vertical installations such as shown in FIG. 2 may not even require a flange 28 interacting with ridge 36 to properly hold filter assembly 13 in position within intake 15. Note that the direction of air flow is into duct 49, so that the force generated by the pressure drop across filter element 15 tends to press flanges 31 against flange 46. As dirt collects on filter medium 19, pressure drop across medium 19 tends to increase, further increasing the force with which flange 31 is held against flange 46 and reducing air leakage through any gaps in this interface.

A resilient detent flange 34 as shown in FIG. 6 is an alternative to the use of support flange 28 or magnetic attraction to hold filter assembly 13 in its proper position within opening 49. Detent flange 34 funs the entire length of side panel 20. In the embodiment shown, arm 34 is integral with flange 32, and interferingly contacts edge 46. As filter assembly 13 is inserted into opening 49, each flange 34 resiliently deflects slightly, and thereafter returns to the position shown in FIG. 6, where filter assembly 13 is held in the desired position within opening 49. Note that the direction of air flow is into duct 14, so that the force generated by the pressure drop across filter element 16 tends to press flanges 31 against flange 45.

Irrespective of the structure of the side panel 20, there is a potential for air leakage between an end panel 17 and the adjacent edge 46 of duct flange 46. The preferred cardboard construction for end panels 17, does not lend itself easily to cheaply applying flanges to these end panels 17 which can form a sealing contact with the adjacent surface 52 while in the installed position. Accordingly, we prefer to locate the feature providing this end panel sealing function in the filter mount opening 15 itself if possible. We have determined that a properly designed and attached gasket 48 made of a resilient material such as low permeability polyurethane foam can reduce the amount of air leaking between edges 45 and end panels 17.

FIG. 7 is a cross section of part of a filter mount opening 15, and shows how we prefer to place and attach such a gasket 48. A portion of a filter element's end panel 17, also in cross section, is shown in its normal installed position. In this installed position, the typical spacing or gap 54 between edge 46 of duct flange 45 and the adjacent surface of end panel 17 is visible. Because of variations from one filter mount opening 15 to another, because of the relatively light construction of typical end panels 17, and because of variations arising in the installation process, the length of this gap 54 will typically vary from one installation to another, and will also typically vary from one point to another on a particular interior edge 45. Although gap 54 is quite small, perhaps typically less than 0.1 in. (0.25 cm.), the fact that gap 54 may extend along the entire length of edge 46 makes it possible for a significant volume of air to bypass filter element 16. Gasket 48 is chosen to have substantial resilience and flexibility to accommodate these unavoidable variations in gap 54 length. Although gasket 48 is shown as rectangular in FIG. 7, it is possible that a wedge shape for the cross section may be even more effective.

In FIG. 7, gasket 48 is shown in cross section extending slightly, perhaps 0.1–0.3 in. (0.25–0.75 cm.), past the duct flange edge 46a and into air passage opening 49 as defined by duct flange edge 46. Gasket 48 is preferably attached by an adhesive strip 50 to the interior surface 47 of filter mount opening 15, so that gasket 48 lies snugly against exterior or outside surface 52 of flange 45. An end surface 51 of gasket 48 presses against the adjacent surface of end panel 17 to form the actual seal. Gasket 48 can comprise 2 lb. low permeability polyurethane or any other material having a relatively good memory characteristic causing it to return to its original shape after being distorted. The cross section dimensions of gasket 48 we use commercially is 0.5 in. wide by 1 in. long (1.25×2.5 cm.). Gasket 48 is preferably attached by adhesive 50 at its end as this allows maximum opportunity for compression when filter unit 13 is installed, but could be attached by a strip of adhesive to flange 45 adjacent to surface 47. This alternative configuration might be easier to attach, but could be less effective in sealing gap 54.

Surprisingly, gasket 48 presses against end panel 17 with force sufficient to create substantial friction tending to retain filter unit 13 in its installed position without other retaining means. The substantial thickness of gasket 48 and the inherent stiffness of the polyurethane foam from which it is made provides significant support and retaining force to filter unit 13 during installation.

The filter assembly shown in FIG. 2 thus has flanges 31 which on two opposite sides of filter unit 13 block gaps between panels 20a, 20b and edges 46. Gaskets 48 close the gap 54 between end panels 17 and edges 46 on the other two sides of filter unit 13. The cooperation of these two different ways of sealing gaps adjacent to duct edges 46 necessitated by the construction of filter element 16 and filter unit 13 substantially reduces the volume of air bypassing filter element 16. Reducing the volume of air bypassing filter element 16 reduces the amount of particulate contamination in the air entering duct 14, and reduces the contamination in the air eventually supplied to the space receiving this air.

The preceding describes our invention and variations to it, all of which are intended to be defined by the claims following.

What is claimed is:

1. An air filtering system including a filter unit for installation in a filter mount opening of an air duct to replace a shallow rectangular filter element, said air duct having an axis defining the general direction of air flow, said filter mount opening having an interior surface, and projecting centrally therefrom an interior peripheral duct flange having a mating surface facing along the air duct axis and interior edges defining an air passage opening, said mating surface adapted to receive the periphery of the shallow filter element, said filter unit having first through fourth panels defining the periphery of the filter unit and together forming a frame for the filter unit, said filter unit frame dimensioned to fit into and project through the air passage opening with close spacing of the first through fourth panels to adjacent interior edges of the flange, said system including a resilient flange gasket disposed along the duct flange and extending past the duct flange edge and into the air passage opening adjacent to the duct flange, said flange gasket for contacting the filter unit's adjacent panel, for forming a seal between the flange and the adjacent panel, and for opposing air flow between the flange interior edge and the filter unit's adjacent panel.

2. The system of claim 1, wherein the filter unit includes a sealing flange extending along the length of one panel and projecting therefrom, said sealing flange for contacting the duct flange mating surface and opposing air flow between them, and for supporting the filter unit in a preferred position, when the filter unit is installed in the filtering system.

3. The system of claim 2 wherein the gasket includes an adhesive strip for bonding to a surface adjacent to the duct flange's interior edge.

4. The system of claim 3, wherein the gasket has a uniform rectangular cross section.

5. The system of claim 4, wherein the gasket is attached to the filter mount opening's interior surface adjacent to the duct flange mating surface.

6. The system of claim 5, wherein the gasket comprises 2 lb. low permeability polyurethane foam.

7. The system of claim 3, wherein the gasket comprises 2 lb. low permeability polyurethane foam.

8. The system of claim 1, wherein the gasket forms an interference fit with the first of the first through fourth sides.

9. The system of claim 8 including adhesive bonding the gasket to at least one of the air duct's interior surface and the duct flange mating surface adjacent to the air duct's interior surface, and wherein the gasket is unattached to the duct flange mating surface in the vicinity of the duct flange interior edge.

10. The system of claim 8, wherein the second panel is adjacent to the first panel, wherein the filter unit includes a sealing flange extending along the length of the second panel and projecting therefrom, said sealing flange for contacting the duct flange mating surface and opposing air flow between them, and for supporting the filter unit in a preferred position, when the filter unit is installed in the filtering system.

11. A filter system including a filter unit having first through fourth side surfaces defining the periphery of the filter unit and together forming a frame supporting a filter element, said filter unit for installation in an air passage opening of an air duct having an interior surface and having an axis defining the general direction of air flow within the duct, said air passage opening defined by a plurality of interior edges of a peripheral flange within the duct and attached to the interior surface thereof, said duct flange further including a peripheral surface facing along the air duct axis, said air passage opening and said frame dimensionally conforming so as to allow during filter unit installation a portion of the frame to enter the air passage opening with the frame's side surfaces closely spaced to the interior edges, and wherein the frame further comprises an exterior flange extending laterally from the first side surface with a flange surface for making surface contact with the duct flange's peripheral surface when the frame is installed, said frame having an external form adapted to enter the air passage opening and closely conform thereto while the frame is installed in the air passage opening, said system further including a resilient flange gasket disposed along the duct flange's peripheral surface and extending past the duct flange edge and into the air passage opening adjacent to the duct flange, said flange gasket for contacting the filter unit's adjacent side surface, for forming a seal between the flange and the side surface, and for opposing air flow between the adjacent flange interior edge and the filter unit's adjacent side surface.

12. The system of claim 11, wherein the gasket forms an interference fit with the first of the first through fourth sides.

13. The component of claim 12 including adhesive bonding the gasket to at least one of the air duct's interior surface and the duct flange mating surface adjacent to the air duct's interior surface, and wherein the gasket is unattached to the duct flange mating surface in the vicinity of the duct flange interior edge.

14. The system of claim 1, wherein the flange gasket has an end surface for pressing against the filter unit's adjacent panel surface.

15. The system of claim 14, wherein the flange gasket is mounted on an exterior surface of the duct flange.

16. The system of claim 1, wherein the flange gasket is mounted on an exterior surface of the duct flange.

\* \* \* \* \*